(12) United States Patent
De La Fuente De Ana et al.

(10) Patent No.: US 7,307,825 B2
(45) Date of Patent: Dec. 11, 2007

(54) LIGHTNING STRIKE PROTECTION SYSTEM FOR AIRCRAFT FUEL TANKS MADE OF LOW ELECTRICAL CONDUCTIVITY COMPOSITE MATERIAL

(75) Inventors: Juan Carlos De La Fuente De Ana, Madrid (ES); Jose Ignacio Lopez-Reina Torrijos, Madrid (ES)

(73) Assignee: Airbus Espana, S.L., Madrid (ES)

( * ) Notice: Subject to any disclaimer, the term of this patent is extended or adjusted under 35 U.S.C. 154(b) by 292 days.

(21) Appl. No.: 10/743,279

(22) Filed: Dec. 22, 2003

(65) Prior Publication Data

US 2004/0246651 A1    Dec. 9, 2004

(30) Foreign Application Priority Data

Jun. 6, 2003    (ES)    ................ 200301351

(51) Int. Cl.
*H05F 3/00*    (2006.01)
(52) U.S. Cl. ...................... 361/212; 361/218
(58) Field of Classification Search .............. 244/1, 244/1 A; 361/212, 215, 216, 217, 218, 117, 361/118, 119, 120
See application file for complete search history.

(56) References Cited

U.S. PATENT DOCUMENTS

| | | | |
|---|---|---|---|
| 3,755,713 A | * | 8/1973 | Paszkowski ................ 361/218 |
| 3,989,984 A | * | 11/1976 | Amason et al. ............. 361/212 |
| 4,502,092 A | * | 2/1985 | Bannink et al. ............. 361/218 |
| 4,628,402 A | * | 12/1986 | Covey ......................... 361/218 |
| 4,839,771 A | * | 6/1989 | Covey ......................... 361/218 |
| 5,698,316 A | * | 12/1997 | Kuras et al. ................. 428/344 |
| 5,845,872 A | * | 12/1998 | Pridham et al. ............ 244/1 A |
| 6,327,132 B1 | * | 12/2001 | Andrivet et al. ............ 361/218 |

FOREIGN PATENT DOCUMENTS

ES    0976653    * 7/1999

* cited by examiner

*Primary Examiner*—Michael Sherry
*Assistant Examiner*—Danny Nguyen
(74) *Attorney, Agent, or Firm*—Ladas and Parry LLP

(57) ABSTRACT

Lightning strike protection system for aircraft fuel tanks made of low electrical conductivity composite material. The system comprises an electrical conductive thin wire mesh (1) that covers the whole external surface of the tank outer skin (I) made of composite and a thick wire metallic mesh (2) overlapping the mesh (1) at a minimum distance of 50 mm to both sides of a row of fasteners (III) joining the said outer skin (I) to one internal part (II) of either composite or metallic material. Both metallic meshes (1, 2) maintain electrical contact by their installation/assembly and by means of metallic countersunk head washers (3) connected to bonding points and set to the gap existing between the fastener (III) and the outer skin (I). The corresponding fabrication process is also described.

18 Claims, 4 Drawing Sheets

LIGHTNING STRIKE PROTECTION SYSTEM FOR AIRCRAFT FUEL TANKS MADE OF LOW ELECTRICAL CONDUCTIVITY COMPOSITE MATERIAL

INVENTION FIELD

The invention relates to a system protecting against severe electrical discharges caused by the lightning impact onto aircraft fuel tanks made of low electrical conductivity composite material (e.g. carbon fibre) and to a method for fabrication thereof as well.

INVENTION BACKGROUND

The composite materials offer a high electrical resistance compared to metallic materials traditionally used for fabrication of fuel tanks. While a metallic material can be considered as an isotropic material from the electrical point of view, the subject composite material (e.g. carbon fibre with epoxy matrix) does not have the same behaviour. The low conductivity existing to composite material is due to the fact that the electrical continuity in this material is only caused depending on the fibre direction. The carbon fibres have a certain electrical continuity so that the fibres of this material show high electrical resistance along the direction perpendicular to them (anisotropy) depending on the epoxy matrix.

The behaviour of this material is found reflected in the corresponding scheme of FIG. 1. This scheme shows the two fundamental items of any structure constructed from a composite material ply lay-up. The composite material fibres allow the electrical current to pass through them easily, while the resin that joins and gives consistency to these fibres does not permit the electrical current go through. The resin material becomes degraded when it is subjected to high current densities. The mentioned degradation causes a failure of the mechanical properties as well as lack of leak tightness to those structures containing liquids as in fact it happens with fuel tanks.

Below noted are the phenomena in connection with both moderated or severe electrical discharges (lightning strike) that must be prevented to a structure made of composite material in order to assure the material structural integrity/tightness:

Hot spots. High density of electrical current to certain punctual spots of the structure such us joints or intersection items that may cause high temperature spots. Should this temperature exceed 200° C. (self-ignition point as considered by fuel authorities FAA/JAA), the fuel can reach the flammable point if the estequiometric concentrations adequate to the interior of the fuel tank are conferred.

Structural damage (holes, delaminations, melting of the material . . . ): Structural damage is caused when a structure is subjected to a strong lightning strike. Should this damage be very severe, it can cause a global structural failure.

Sparking phenomena: the electrical current flow passing through materials having different resistivities and being at geometrically separated places may produce electrical difference potential among them. Electrical arc discharges will be caused (sparking condition) thus provoking the ignition of the fuel/inflammable liquid contained to the interior of the structure.

As previously described, the usage of low electrical conductivity composite materials for the fabrication of fuel tanks generates additional risk to that related to structural damage. It may involve the global/catastrophic failure. This is the reason why the concerned item must be provided with the adequate protection in order to prevent the risk from happening as a result from a severe lightning strike caused by nature (flashes). The system of this invention shows the possibility to provide the fuel tank structure with materials, a number of items and their adequate construction to optimise protection.

The structures made of composite materials and specially carbon fibre materials exhibit an ohmic resistance value of 1000 times above that of one structure equivalent to aluminium material. Upon the experience gained by electrical discharging tests and studies, this circumstance permits to foresee the behaviour of a structure made of carbon fibre (or any other low electrical conductivity composite material). The damage caused is major and of different nature. Therefore, the protection system must be assumed having in mind these properties inherent to the material. The mechanism of damage thus provoked by said electrical discharging onto the carbon fibre structures, when compared to the traditional metallic components (aluminium material), can be distinguished in the following way. While, owing to high temperature existing and the slight distortion failure inherent to the process, the traditional metallic component damage is often shown as a perforation caused by the heating of the material up to reaching its melting state, the carbon fibre composite material shows delamination damage (such as material fibres torn out and ruptured). This damage can be associated with a surface visibly deteriorated. Deterioration of surface proves to be greater than that observed in metallic material showing frequent perforations/holes at the area struck by the electric discharge. The failed electrical properties are no longer limited to a perforation failure with the corresponding local stress accumulated to this area but a degradation of the greater extension properties also appears by the rupture of the material fibres which are mainly responding to support the loads provisioning for the design of the structure.

Considering the high electrical resistance of the composite material structures examined hereto, the traditional hypothesis, used for metallic materials permitting to simplify the electric current pulse that emulates the lightning strike effect to a null frequency, is not applicable to this last type of composite material structures. This makes that the frequency must be considered by involving electrical current peaks, phase displacements and transient currents that increment the effect induced by the same structure and extend the damage caused to the structure. This wants to emphasize other phenomena such as the sparking. This phenomena shows that the potential difference by induced current and phase displacements, can provoke the arc sparking inside the fuel tank.

The invention herein indicated deals with the presentation of a system based on the main guideposts for fabrication of the composite material tanks with the possibility to add metallic items (high conductivity metallic substructures, meshes) to assure for the integrity of the fabricated fuel tank and correct events like the lightning strike.

The invention deals with the practice to construct the concerned item (fuel or other flammable liquid tank) using the optimum arrangement of the exposed items to assure that when a lightning strike occurs, the fuel tank has the capability to conduct the electrical current by building up part of the electric arc. Also, the way how the airplane outer skin, internal structural parts, fasteners (rivets), metallic meshes and other items specifically devoted to protection are arranged, permits to achieve a fuel tank capable to support the direct effect of an electric current discharge. Those consequences coming from the lightning strike will be remedied and the derived effects of this event helped too.

DESCRIPTION OF THE INVENTION

The herewith revealed protection system will treat to minimize the damage provoked to fuel tanks made of composite material (commonly used nowadays for aeronautic structures) by channelling the electric current that an ambient flash liberates by lightning strike or any other high intensity electric discharges. The dispersion of the electric current will thus be helped and low electrical resistance conducting ways be allowed. The severe structural damage can be avoided in this way if a lightning strikes onto the high electrical resistivity parts which integrate the airplane structure.

The system will consider a global structure at its greatest part made of a low conductivity composite material (such as the carbon fibre material) having internal items or a substructure that may be both metallic or composite made of. In general, and as previously described, the composite materials have a low electrical conductivity in a direction perpendicular to the fibre, so that a severe lightning strike (coming from an ambient flash)—that merely happens without any protection media-, can lead to damage rebounding on a failure onto the fuel tank structural construction or failed liquid tightness condition. Generally, in this case, the main parameter that can determine the damage evaluation is the thickness of the material used.

Basically the general configuration of the structure integrating the fuel tank used to contain flammable liquids and subjected to the protection system of this invention will consist of the following:

An external tank coating of low electrical conductivity but not isolating composite material. The carbon fibre material is the commonly accepted and greatly addressed material for such a purpose to the present structures.

A part plus an interior element that can be made of composite or metallic material. The said item can be considered as an item integrating the structure and assigned to the electrical current conduction by means of a fastening stem provided with a metallic washer improving the electrical conductivity and fastening purpose.

A fastener such as a rivet or titanium screw joining the two above noted elements (part plus interior item). The fastener will have a countersunk head and be provided with a metallic washer (if the interior element is also made of metallic material). It will be fitted with isolating material (i.e. fibreglass) if the interior element is made of composite. The fastener will have a metallic nut to the end as required to attach the integrating parts. For the right installation of the fastener, a washer may be required between the nut and the lower face of the internal part to be fastened. If the interior part is of composite, the said washer shall be made of isolating material as for instance fibreglass material. A metallic washer shall be used if the interior part is also made of metallic material. This will assure the compatibility of materials.

Finally the structure is to painted using an organic finish covering its external surface.

For this reason and taking into account all the investigation study and previous experience in protection of this type of structure, a configuration will be proposed to optimise the electrical current flow passing through these structures by using the following components:

Exterior thin wire mesh of bronze material installed onto the outer surface of the fuel tank contributing to the electrical current dispersion and preventing from punctual location of the damage. This type of mesh provided with an adequate structure thickness will offer prevention of perforation and holes to the fuel tank This being a detriment to the leakage tightness condition required when exposed to severe lightning strike.

Exterior thick wire mesh made of bronze material overlapped to the above noted thin wire mesh up to a minimum of 50 mm to both sides of the rows of the structural (screws/rivets) fasteners. These meshes optimise the always critical behaviour of the attached points between both composites and hybrid joints to which composite material to metallic material is fastened. The behaviour specially critical to the structural joints of this type of materials results from the difference of electrical resistances and due to failed electrical contacts between the elements involved in the fastened area itself which can provoke high current densities.

Therefore, the failed electrical continuity to the fastened parts leads to the need of specially protecting the concerned areas by optimising the elements available to such a purpose. The thick bronze wire mesh overlapping the thin bronze wire one along the fastener row, allows to increase the exterior metallic cross section and improve the electrical current dispersion along the fastener row. This will prevent the current flow from being repressed to a single fastener causing high current densities and resulting in strong current potential differences to the internal surfaces. The current potential differences could, in turn, build up an internal electric arc to the structure (sparking condition).

Also, the possibility to disperse the electrical current efficiently to the fastener rows permits to avoid the hot spot phenomena to the internal face of the tank coating thus causing the ignition of the fuel.

The washers for bonding connection are the third element proposed in the global protection of this invention with which a fuel tank made of composite material is to be provided. The subject washers permit to avoid the electrical current accumulation to critical parts as fasteners (screws, rivets) since these items are in fact inclined to accumulate it. The fastener stem is definitely the most critical part. The fastener stem offers a way for the electrical current to flow past from the exterior surface towards the structural surface and items inside the fuel tank. The bonding washers permit to make use of two circumstances appeared to structural joints. On one hand, the bonding washers permit the electric connection between external meshes and structural interior elements providing that the elements are made of metallic material and are in contact with the main metallic structure of the fuel tank. This defines a way to conduct the current discharged and permits to drain it through the metallic structures having high conducting capacity. It avoids that the lightning strike liberates energy causing structural damage. On the other hand, the washer assure for optimum fastening of rivets/ screws and provide obvious advantages in assembly installation. In addition to this, the diminished gap of the noted fasteners also assures for a good electrical contact and decreases the electrical resistance to the joint. The scheme of FIG. 2 shows the mechanism herewith characterised.

Finally the requirement to lay up one fibreglass coat on to the contact surface between the internal side of the low conductivity composite coating (e.g. carbon fibre) and the metallic internal parts. The fibreglass layer complies with two technological aims:
  a) The galvanic incompatibility is on one hand prevented by installing materials for same galvanic level and avoiding that the internal metallic structure becomes corroded. This phenomenon would be a risk to the integrity of the proposed protection and specially the mechanical capacity of the resulted structure.
  b) The fibreglass layer overlapped by 25 mm minimum to both sides of the metallic part surface will avoid the level potential differences between points separated by air and/or isolating surface that might cause sparking inside the fuel tank.

The problem posed by this invention has already been subject to attempt of previous solution. In this way, the patent U.S. Pat. No. 3,775,713 points out that, in order to protect the regions exposed to lightning strike, a knitted wire mesh is to be put on the exterior surface and the organic coating installed to the top section. However, this protection offers an insufficient cover to the fastener (screws and/or rivets) heads such as described in the referred patent. Since the considered structure is made of fibreglass material and therefore, it is a non conducting material, the damage caused by an electric discharge or lightning strike to one of the subject fastener heads will provoke severe damage to the assembly installation.

The high electrical conductivity aluminium material is the material for protection against general electrical discharges or lighting strikes which has been traditionally used. The aluminium material is often installed by flame spraying. A knitted mesh of that material such as a sheet or metallic sheet plating will be used. This method works out satisfactorily when the structure to be protected is an isolating structure (fibreglass or Kevlar material). However, the aluminium is not compatible with definite composite materials as those fabricated from carbon fibre material. This incompatibility is based on a very different galvanic current that makes the aluminium show important corrosion problems that engage the efficiency of the applied protection. The isolating material of the proposed protection consisting on aluminium installation is not a valid option and it loses the possibility to disperse the electric level derived from an electric discharge.

Another solution to the problem posed is constituted by the patent application WO-A-8401487. This patent develops a system to protect the epoxy and graphite fibre composite structure appointed to aeronautic purposes. The said composite structure shows a fastener inserted. The structure fastener head surface is orientated towards an external surface/side of the composite structure. The integrating elements of the approached solution indicated to this application are the following: one coat of graphite weave nickel plated extended throughout the length of the said portion of the composite, one nickel plating put on each fastener head and finally one coat of isolating material. This means that a complete protecting layer greatly built up by diverse materials is made available to the whole structure including the fastener head and with this, a considerable weight would be established. As it is well known, this weight is highly unwanted for aeronautic structures.

The patent ES-A-2006356 proposes the installation of isolating material between one metallic mesh and a composite coating; this element results in a determining element in the philosophy to achieve a structural protection system. The protection philosophy is radically different to the solution proposed to this invention. Whilst the invention presented to the patent ES-A-2006356 is based on the centralisation of the majority of the electrical current to definite surfaces of the structure having a high maintenance and fabrication cost when integrating airplane parts, the present invention contemplates the dissipation of the electric current by using the entire external structure surface and helping its dissipation and drainage so that the quantity of damage becomes minimum.

A system of protection proposed in patent EP-A-0685389 is based on the current conduction of the greatest part of the electrical discharge to definite places to which materials or metallic straps have been arranged to that purpose. These materials have a high capability to drain high current intensities. However, the noted metallic straps involve a considerable increase in weight to the structure, thus being difficult to install the assembly. As the metallic strap has not been cured before, frequent unbonds can occur. This would lead to increase the necessary maintenance operations and require to perform repair actions due to the frequent surface damage existing. The patented solution would considerably raise the cost. The usage of the metallic mesh mentioned to this invention is evaluated not only as being easy but also contributing to a remarkable improvement to the protection level since the mesh permits a better distribution of the lightning current and the structural integrity is protected in case of lightning strike attachment. The patent EP-A-0685389 does not offer the parameters in connection with the electrical discharge level with which the patented system has been proved. This has been considered to each section without presenting, therefore, the conditions taken into account from the tests carried out. Values like A. I. (integral action) that allow to evaluate the damage caused to the structure to be protected against a possible lightning strike, are not reflected when describing the patent EP-A-0685389. The efficiency of the protection system invented, will depend greatly on the geometric/dimensional features of the metallic strap proposed. This is the point on which the greatest part of the protection bestowed to the patented solution, wants to be supported.

The patent EP-A-0248122 shows an obsolete solution. The solutions seems to be of a dubious economic profit considering the installation and fabrication of elements reflected. Therefore, the electrical continuity is achieved by installing additional elements called "conductive sleeves". These elements make the assembly complex and raise the cost excessively. They increment the weight and add a serious risk of delamination and damage to the composite structure. Therefore, the mechanical properties of such a resulting structure become worsen, considering that the main and last objective is laid on the mechanical structure integrity.

The copper mesh proposed in patent EP-A-0248122 shows a bad behaviour when facing the corrosion condition outdoors. Though the improved conductivity of copper to bronze is well known, in estimating the aged copper mesh as proposed by the patent, the lightning strike testing reflected a copper mesh behaviour worse than the bronze mesh. For the same testing conditions, a copper mesh can reach double temperature than the bronze one and the delaminated surface extension for copper meshes augments up to five times. The possibility to obtain hot spots and therefore, the probability that the fuel can become inflamed is greater with a copper mesh protection than with a bronze mesh protection using these conditions. The integrity of the structure can become noticeably damaged when considering the high probability that a delamination occurs so that the repair actions to the structure to be protected, must be increased.

Likewise, in the solution described to patent EP-A-0248122, the conditions to which the structure is tested are not contained depending on the zone classification attributed. The protections proposed in this invention are mainly based on tests including the subject technical parameters as defined for the most severe testing. The noted tests will consist of a direct lightning strike to the horizontal stabiliser wing tip containing the flammable material or vapours as for example aircraft fuel (zone 1:200 kA and AI=$2.10^6$ $A^2$.s.) When using the adequate parameters, the validation and certification of the configuration is allowed. The said parameters will depend in turn, on the probability of direct lightning strike (to definite zones). The validity of the solutions already patented does not show sufficient suggestion as to assure the solution efficiency when compared to the requirement level as determined by the JAA/FAA authorities. This entity will provide the required credibility to the protection described in the respective patents.

The system proposed in this invention results in a great simplicity when installing. It offers a low maintenance cost when compared to other solutions already patented and as described above. The solutions previously mentioned offer more complex configurations and are connected with an weight increment, low maintainability and high cost. They do not offer improvements to the protection of the structure against lightning strike. By this reason, the solution of the invention herewith described, is basing its efficiency on the experience gained in long practice not only in fabrication and assembly installation of composite materials and metallic materials but also in intensive investigation work carried out by multiple testing that allow to optimise the configuration of the fastened zones and make it have a good behaviour when tested for electrical discharging. Also the mentioned solution will so offer a system of structural protection against lightning strike.

The applicant has developed intense investigation work in order to achieve a satisfactory and cheaper system. Also, a system slighter than those systems previously achieved, has been worked out. Finally various protection systems have been obtained as included in the Spanish patent ES-A-2006356 and ES-A-2008432. As an evolution to the first of the mentioned patents, a system supplying applicability and easiness for fabrication has been proposed. This application wants to show this so much simple system.

This invention has also developed a procedure to fabricate the lightning strike protection system as above described. It comprehends the following steps:

Fabrication of the composite outer tank coating together with the lay-up of the carbon fibre material layers as required up to achieving the specified thickness; in this same fabrication process, the composite layers are laid up and simultaneously subjected to cure cycle in addition to the composite layers mentioned previously.

Installation of the thin bronze wire mesh to the external surface of the tank coating covering its whole exterior area.

Installation of the thick bronze wire mesh to the fastener row overlapping the preceding mesh to a distance not less than 50 mm to both sides of the fastener row and at the outer side of the tank coating.

Installation of a fibreglass layer or any other isolating material to the inner surface of the skin and covering the required distance in order to prevent the contact with the internal part to be fastened onto the tank coating.

Location of the internal part to be fastened and drilling or appropriate countersinking to the outer surface of the tank coating.

Installation of the washers (if the internal part is made of metallic material) and subsequent installation of the fastener (rivet or screw) with appropriate washer and nut if applicable.

Application of an organic finish coat to the exterior (paint material).

APPLICABILITY OF THE INVENTION

This invention will be manufactured as a system that permits the protection of a structure against the lightning strike. The invention is based on its capacity to induce an improvement as regards maintainability, weight savings, reducing costs and easiness to fabricate. The efficiency of the solution applied for has been checked by tests set on firm parameters and requirements from the certification authorities (JAA).

The assembly installation of the components integrating the protection system will be found of a great simplicity since the mesh material can be installed at the same time that the cure cycle is performed to the outer tank coating. Thus, the fabrication system of the proposed invention can be enormously simplified.

The simple laying of one fibreglass ply between the outer skin and the internal part to be fastened, will allow the usage of both composite and metallic materials to this ultimate item produced without any risk of corrosion and or sparking failure. The efficiency of the joint will also be maintained as regards the structural protection.

The usage of both one thin wire mesh and one thick wire one permits to have a simple fabrication solution for critical zones. The attempt is to prevent these zones from sparking what might lead to the ignition of the fuel. The thick wire mesh will overlap the thin wire one. The purpose to use two types of meshes is to allow increase the protection to the most critical areas without exposing the global efficiency of the proposed configuration. Therefore, the usage of additional elements necessary for other solutions patented, will be avoided in this way, since their installation is difficult to perform and also, they are expensive from the assembly and maintenance point of view. The addition of global weight for the resulting configuration will not be preferable.

The bronze mesh proposed by this invention shows good characteristics for maintainability and durability guaranteed by the tests performed along the time and no special coating for integrity will be necessary.

BRIEF DESCRIPTION OF THE DRAWINGS

More details on this invention and references to the annexed drawings are described below:

The FIG. 1, previously mentioned, shows the two essential items (fibre material and matrix for a structure built up by laying up plies of composite.

Figure 1:
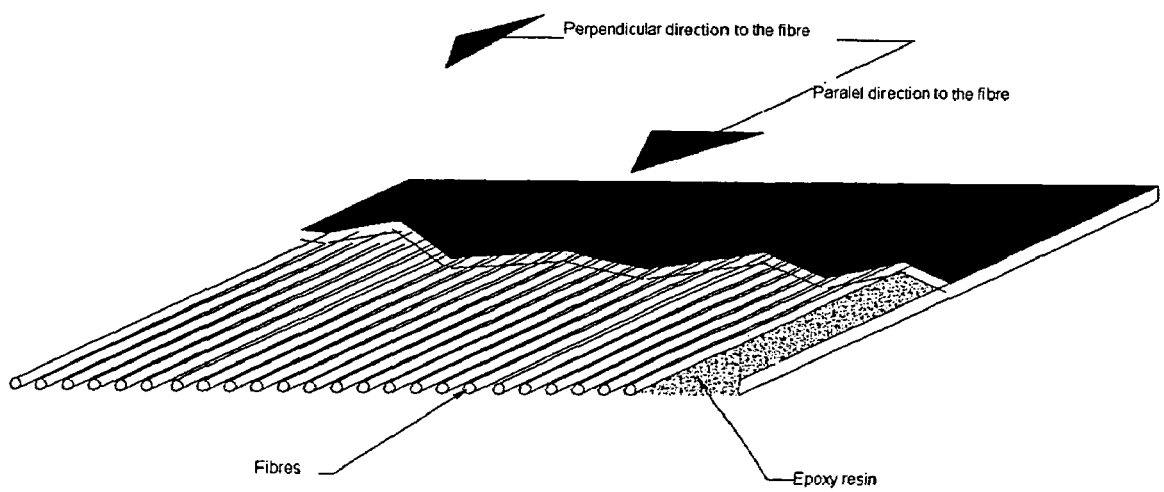
Figure 2:
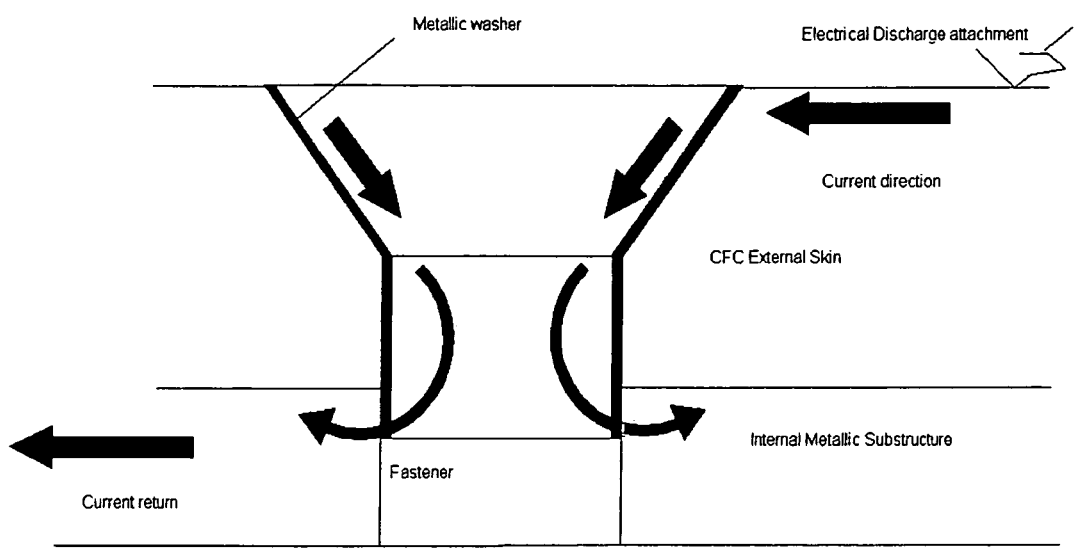

The FIG. 2, also previously mentioned, shows schematically the distribution mechanism of the electrical current when generated by lightning strike.

Figure 3:
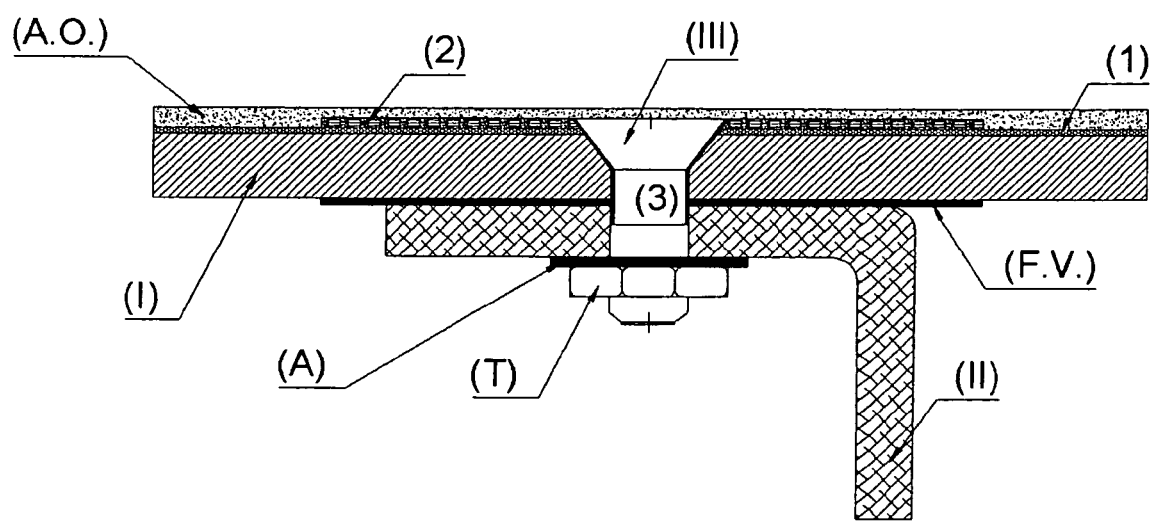

The FIG. 3 illustrates the section view of part of the composite coating structure of a fuel tank.

Figure 4:
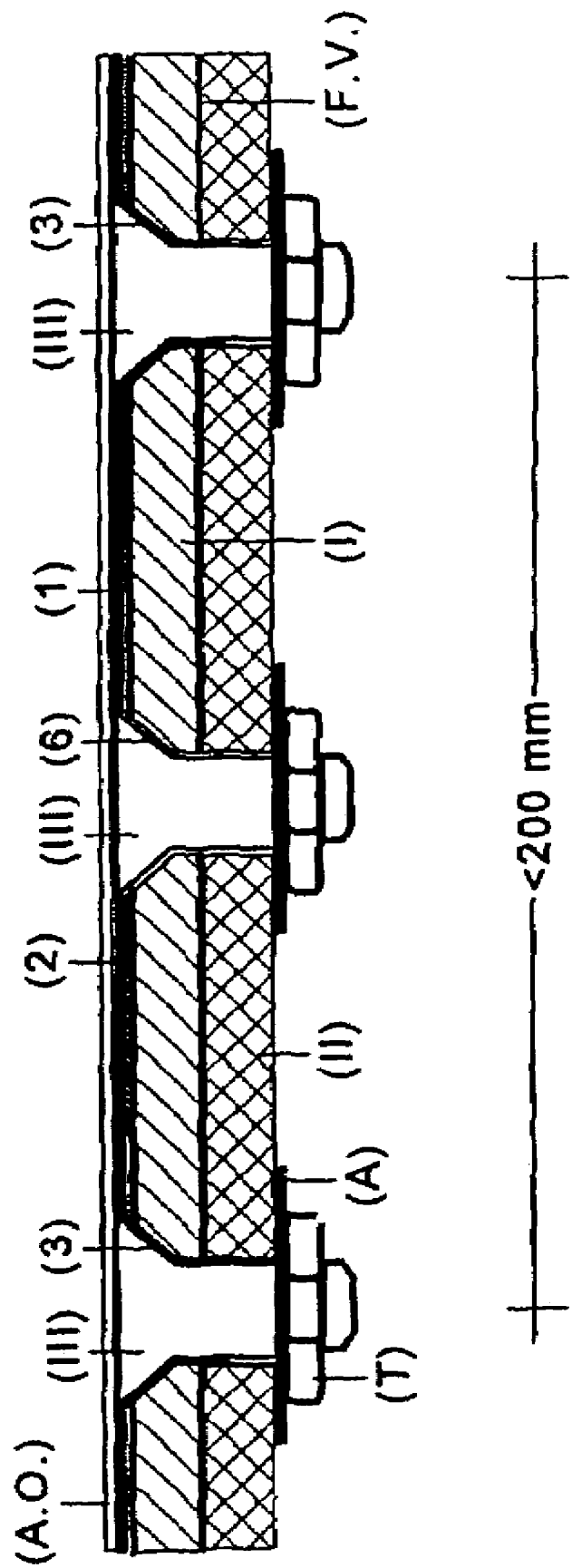

The FIG. 4 illustrates a section view transverse to the FIG. 3 of the part of the composite coating structure of the fuel tank of the FIG. 3.

DESCRIPTION OF A PREFERRED EMBODIMENT

In order to explain the invention but in no way restrict it, a general representative example of the system presented is described below: The detailed drawing section presented (refer to FIG. 3) will be of help to represent an external zone corresponding to the skin (I) of a fuel tank made of composite (carbon fibre+epoxy matrix). This zone is to be joined to an internal metallic part (II) (structural internal element of the tank) by means of a fastener (III) (e.g. a titanium countersunk head screw or rivet). The fastener stem will be attached to the internal side by means of a washer (A) made of either isolating material if the interior part—to which it is fastened—is made of composite, or metallic material if the interior part is made of metallic material too. Also a nut (T) will be used to assure the fastening purpose. The following items will also be used for protection of the defined system.

A thin copper mesh (1) covering the external surface of the skin (I). The thin copper mesh is to be laid up by curing it together with the skin.

A thick copper mesh (2) overlapped to the thin copper mesh at both sides of a row of fasteners (III), by a minimum of 50 mm each way. The thick copper mesh will cover the fastener row and it has to be cured simultaneously with the outer skin (I) made of composite material. After this process, drilling and countersinking is to be carried out for the installation of fasteners (III) that will allow the attachment of the outer skin (I) to the internal part (II).

A countersunk metallic washer (3) made of titanium, as for instance, will be used. The washer adjusts to the gap between the fastener and the carbon fibre structure and contacts electrically the external meshes to the metallic substructure and/or metallic structural interior element intended to that purpose. The subject washer will be made of a material compatible with the fibre and fastener materials. It will also be of high electrical conductivity. The installation of said washer will not be necessary to the whole row of fastener but only every 200 mm approximately. The said distance will assure for optimisation as regards fabrication, weight and costs without engaging the efficiency of the protection.

A ply of fibreglass (F.V.) to be put to the contacting surface between the skin and the metallic interior structural element.

A washer (A) will allow the fastening of the parts (I) and (II) by means of the fastener (III) and prevent the attachment from possible sparking condition to the interior as a result from the electric potential difference caused by disparity of resistivities among diverse materials. The item (A) will be made of isolating fibreglass material if the internal part (II) is to be made of composite material. On the contrary the said item will be made of metallic material if the internal part is going to be made of metallic material too. Electrical continuity must be assured by doing a good electrical contact.

Finally the assembly is covered by an non-conductive organic finish (A.O.) to the outer skin (I), as for example paint material.

This description has been stated with reference to what the preferred embodiment of the invention is considered at present. Though, of course, any modification esteemed as pertinent, can be added to this description provided that it is reported within the scope of the following claims. The said modifications might include the usage of different materials, different provisions for the described protection system components, and the like.

Three of the row of fasteners (III) described above are shown FIG. 4. The fasteners at the opposite ends of the row are in the above-described metallic countersunk washers (3). The fastener in the middle is not, whereby to have a gap (6) between the middle fastener (III) and the corresponding hole in the outer skin (I) and the internal part (II).

The invention claimed is:

1. A system for protecting a structure against electrical discharges,
    the structure comprising an outer skin (I) of composite having an exterior surface and opposite surface, an internal part (II) of either composite or metallic material having one side facing the outer skin and another side, and a row of metallic fasteners (III) each having a nut (T) fastening the outer skin (I) with the internal part (II), and
    the system comprising a first metallic mesh (1) having a first side and an opposite side on substantially all of the exterior surface of the outer skin (I), a second metallic mesh (2) on at least part of the first side of the first metallic mesh (1), a washer (A) between the nut (T) and the other side of the internal part (II), and an organic finish (A.O.) that covers entirely the exterior surface, the system characterized in that:
    the first metallic mesh (1) is a thin metallic wire mesh laid up and cured simultaneously with the outer skin (I) of composite;
    the second metallic mesh (2) is a metallic wire mesh thicker than the thin metallic wire mesh that overlaps the first metallic mesh (1) a minimum of 50 mm from the row of the fasteners (III), and has been put by simultaneously with the curing of the outer skin (I) and subsequently drilled and countersunk for installation of the fastener (III); and
    metallic countersunk washers (3) in a subset of the row of the fasteners (III) so that there is at least one of the metallic countersunk washers (3) every 200 mm, each of the metallic countersunk washers (3) being installed at a gap existing between each of the fasteners (III) and a corresponding hole in the outer skin (I) and the internal part (II).

2. A system as in claim 1, characterized in that both the first and second metallic meshes (1 and 2) are made of bronze and the composite of the outer skin (I) consists essentially of carbon fibre material and epoxy matrix.

3. A system as in claim 1, characterized in that the washer (A) is made of isolating material when the internal part (II) is composite while said washer (A) is metallic and the internal part (II) is also metallic.

4. A system as in claim 1, characterized in that it also includes an isolating ply (F.V.) between the outer skin (I) and the internal part (II) and the internal part is metallic.

5. A system as in claim 1, characterized in that both the first and second metallic meshes (1 and 2) are made of bronze and the composite of the outer skin (I) consists essentially of carbon fibre material and epoxy matrix.

6. A system as in claim 2, characterized in that the washer (A) is made of isolating material and the internal part (II) is composite while said washer (A) is metallic and the internal part (II) is also metallic.

7. A system as in claim 1, characterized in that the washer (A) is made of isolating material and the internal part (II) is composite while said washer (A) is metallic and the internal part (II) is also metallic.

8. A system as in claim 5, characterized in that the washer (A) is made of isolating material and the internal part (II) is composite while said washer (A) is metallic and the internal part (II) is also metallic.

9. A system as in claim 2, characterized in that it also includes an isolating ply (F.V.) between the outer skin (I) and the internal part (II) and the internal part is metallic.

10. A system as in claim 3, characterized in that it also includes an isolating ply (F.V.) between the outer skin (I) and the internal part (II) and the internal part is metallic.

11. A system as in claim 5, characterized in that it also includes an isolating ply (F.V.) between the outer skin (I) and the internal part (II) and the internal part is metallic.

12. A system as in claim 6, characterized in that it also includes an isolating ply (F.V.) between the outer skin (I) and the internal part (II) and the internal part is metallic.

13. A system as in claim 7, characterized in that it also includes an isolating ply (F.V.) between the outer skin (I) and the internal part (II) and the internal part is metallic.

14. A system as in claim 8, characterized in that it also includes an isolating ply (F.V.) between the outer skin (I) and the internal part (II) and the internal part is metallic.

15. A system as in claim 9, characterized in that it also includes an isolating ply (F.V.) between the outer skin (I) and the internal part (II) and the internal part is metallic.

16. A process for manufacturing the system of claim 15, comprising the following steps:
    fabricating the outer skin (I) by laying-up carbon fibre material plies and subjecting the resulting lay-up to a cure cycle simultaneously with:
        the bronze first metallic mesh (1) put onto the external surface of the outer skin (I) and covering the whole external surface,
        the bronze second metallic mesh (2) aligned with the fastener row and overlapping the bronze first metallic mesh not less than 50 mm on both sides of the row of fasteners, and
        the isolating ply (F.V.) put onto the opposite surface of the outer skin (I) covering the required a distance that avoids contact between the internal part (II) and the outer skin (I),
    fastening the internal part (II) and drilling and countersinking the external surface of the outer skin (I);
    installing the metallic countersunk washer (3) and, subsequently, the fastener (III) with the washer (A) and nut (T); and
    applying the organic finish (A.O.).

17. A process for manufacturing the system of claim 11, comprising the following steps:
    fabricating the outer skin (I) by laying-up carbon fibre material plies and subjecting the resulting lay-up to a cure cycle simultaneously with:
        the bronze first metallic mesh (1) put onto the external surface of the outer skin (I) and covering the whole external surface,
        the bronze second metallic mesh (2) aligned with the fastener row and overlapping the bronze first metallic mesh not less than the 50 mm on both sides of the row of fasteners, and
        the isolating ply (F.V.) put onto the opposite surface of the outer skin (I) a distance that avoids contact between the internal part (II) and the outer skin (I);
    fastening the internal part (II) and drilling and countersinking the external surface of the outer skin (I);
    installing the metallic countersunk washer (3) and, subsequently, the fastener (III) with the washer (A) and nut (T); and
    applying the organic finish (A.O.).

18. A system for protecting a structure against electrical discharges,
    the structure comprising an outer skin (I) of composite having an exterior surface and opposite surface, an internal part (II) of either composite or metallic material having one side facing the outer skin and another side, and a row of metallic fasteners (III) every 200 mm along the row respectively having nuts (T) on first ends for fastening the outer skin (I) with the internal part (II), and
    the system comprising a first metallic mesh (1) having a first side and an opposite side on substantially all of the exterior surface of the outer skin (I), a second metallic mesh (2) on at least part of the first side of the first metallic mesh (1), a washer (A) between the nut (T) and the other side of the internal part (II), and an organic finish (A.O.) that covers entirely the first side, the exterior surface and a second end of the fastener (III) opposite the nut and at the second metallic mesh, the system characterized in that:
    the first metallic mesh (1) is a thin metallic wire mesh laid up and cured simultaneously with the outer skin (I) of composite;
    the second metallic mesh (2) is a metallic wire mesh thicker than the thin metallic wire mesh, overlaps the first metallic mesh (1) a minimum of 50 mm from opposite sides of the row of the fasteners (III), and has been put by simultaneously with the curing of the outer skin (I) and subsequently drilled and countersunk for installation of the row of the fasteners (III); and
    metallic countersunk washers (3) across a gap between the fasteners (III) of the row and the drilled and countersunk outer skin (I).

* * * * *